United States Patent [19]

Morikawa et al.

[11] Patent Number: 4,716,950
[45] Date of Patent: Jan. 5, 1988

[54] RADIAL TIRE FOR PASSENGER CAR

[75] Inventors: Tuneo Morikawa, Hadano; Tetsuya Kuze, Hiratsuka, both of Japan

[73] Assignee: The Yokohama Rubber Co., Ltd., Tokyo, Japan

[21] Appl. No.: 843,429

[22] Filed: Mar. 24, 1986

[51] Int. Cl.[4] .......................... B60C 9/20; B60C 9/08; B60C 15/06

[52] U.S. Cl. .................................. 152/526; 152/541; 152/543; 152/546; 152/547; 152/560

[58] Field of Search ............... 152/543, 541, 546, 547, 152/560, 526, 539

[56] References Cited

U.S. PATENT DOCUMENTS 4,085,787  4/1978  Maiocchi ............................ 152/543

FOREIGN PATENT DOCUMENTS 1276298  6/1972  United Kingdom ................ 152/543

Primary Examiner—Donald E. Czaja
Assistant Examiner—Thomas Bokan
Attorney, Agent, or Firm—Armstrong, Nikaido, Marmelstein & Kubovcik

[57] ABSTRACT

A radial tire for a passenger car characterized in that an upper filler is disposed on a bead filler positioned on a bead wire buried in each bead portion of the tire, and a single steel reinforcing layer is interposed between the upper filler and the bead filler so that it extends from outside the upper filler to the inside of the bead filler and its height H from a bead heel does not exceed 50% of a sectional height T of the tire.

5 Claims, 9 Drawing Figures

RADIAL TIRE FOR PASSENGER CAR

BACKGROUND

This invention relates generally to a radial tire for a passenger car, and more particularly to a radial tire for a passenger car having an improved structure for the portion of the tire ranging from bead portions to its side wall portions in order to improve driving stability and durability without reducing driving comfortableness.

Generally, radial tires consist of a pair of right and left bead portions, a pair of right and left side wall portions continuing the bead portions, respectively, and a tread portion interposed between the side wall portions. Furthermore, a carcass layer having a cord angle in the range of 70° to 90° in a tire circumferential direction is fitted between the bead portions, and a plurality of belt layers which have cord angles of 10° to 35° in the tire circumferential direction and in which the cords of one of the belt layers cross those of the other belt layers is disposed on the carcass layer at the tread portion.

In the radial tire of the type described above, since the reinforcing cords of the carcass layer are arranged substantially at right angles to the tire circumferential direction, deformation of the side wall portions is easy to develop during driving. Therefore, although good driving comfortableness can be obtained in a vertical direction, the delay of maneuvering response and unstability are likely to occur in a longitudinal direction as well as in a transverse direction due to excessive deformation.

Means for improving the problem resulting from the excessive deformation described above while maintaining good driving comfortableness is disclosed, for example, in Japanese Patent Application Kokai Publication No. 57-18503 and Japanese Patent Publication No. 56-47004.

In Japanese Patent Application Kokai Publication No. 57-18503, a reinforcing layer is disposed in close contact with the outer or inner side of a bead filler in such a manner as to extend in the range of 50 to 75% of the sectional height of the tire.

If the reinforcing layer is disposed outside the bead filler, it undergoes compressive deformation in the proximity of a rim flange, while it undergoes compressive deformation at the side wall portions when it is disposed inside the bead filler. Therefore, durability of the tire, particularly its high speed durability and load durability, cannot be improved. Moreover, since the upper half of the reinforcing layer passes through a neutral axis, rigidity cannot be increased and driving stability cannot be improved.

Therefore, this prior art reference attempts to obtain the reinforcing effect by disposing the reinforcing layer in such a manner as to extend beyond 50% of the tire sectional height. As a result, a flex zone (bending zone) becomes extremely narrow and driving comfortableness drops.

On the other hand, Japanese Patent Publication No. 56-47004 disposes the reinforcing layer along the neutral axis.

Therefore, the reinforcing layer receives neither compressive stress nor tensile stress so that the rigidity improving effect by the disposition of the reinforcing layer is small and driving stability cannot be improved.

As described above, the conventional means are not entirely satisfactory in obtaining the intended effects.

SUMMARY

The present invention therefore contemplates to provide an excellent radial tire for a passenger car which can improve driving stability and durability (particularly high speed durability and load durability) without reducing driving comfortableness by improving a reinforcing structure of the tire from its bead portions to its side wall portions.

In a radial tire for a passenger car of the type which consists of a pair of right and left bead portions, a pair of right and left side wall portions continuing the bead portions, respectively, and a tread portion interposed between the side wall portions, and in which a carcass layer having a cord angle in the range of 70° to 90° to the tire circumferential direction is disposed between the right and left bead portions, and a plurality of belt layers which have a cord angle in the range of 10° to 35° to the tire circumferential direction and in which the cords of one of the belt layers cross those of the other belt layers are disposed on the carcass layer at the tread portion, the object of the present invention described above can be accomplished by a radial tire for a passenger car which is characterized in that an upper filler is disposed on a tread portion side of a bead filler positioned on a bead wire which is buried in each bead portion, and a single layer of a steel reinforcing layer is disposed between the upper filler and the bead filler along the inside of the bead filler from the outside of the upper filler so that the height H from its bead heel does not exceed 50% of a tire sectional height T.

The above and other objects and novel features of the present invention will become more apparent from the following description to be taken in conjunction with the accompanying drawings.

THE DRAWINGS

THE PREFERRED EMBODIMENTS

Figure 1:
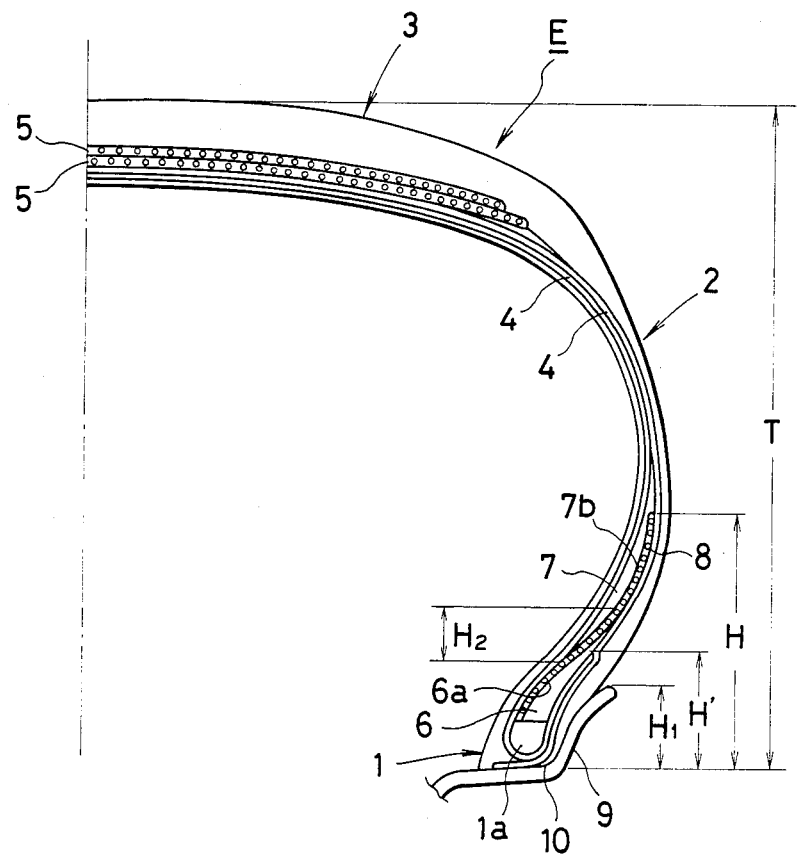
FIG. 1 is a partial cut-away schematic sectional view of a radial tire for a passenger car in accordance with the present invention.

In FIG. 1, symbol E represents a radial tire for a passenger car in accordance with a first embodiment of the present invention. The radial tire E consists of a pair of right and left bead portions 1, 1, a pair of right and left side wall portions 2, 2 continuing the bead portions 1, 1, respectively, and a tread portion 3 interposed between the side wall portions 2, 2. A carcass layer having a cord angle in the range of 70° to 90° to the tire circumferential direction is fitted between the bead portions 1, 1, and a plurality of belt layers 5 which have a cord angle in the range of 10° to 35° to the tire circumferential direction and in which the cords of one of the belt layers cross those of the other belt layers are disposed on the carcass layer 4 at the tread portion 3.

In accordance with the present invention, an upper filler 7 is disposed on a bead filler 6 positioned on a bead wire 1a buried in each of the bead portions 1, 1 (that is, on the side of the tread portion 3), and a single layer of a steel reinforcing layer 8 is disposed between the upper filler 7 and the bead filler 6 from the outside 7b of the upper filler 7 along the inside 6a of the bead filler 6 in such a manner that its height H from a bead heel does not exceed 50% of a tire sectional height T.

This structure will be explained in further detail. As shown in FIG. 1, the steel reinforcing layer 8 is disposed in such a manner that is extends from the outside 7b of the upper filler 7 along the inside 6a of the bead filler 6 and is interposed between the upper filler 7 and the bead filler 6.

Here, the steel reinforcing layer 8 is preferably disposed in such a manner as to satisfy each of the following relations:

$$1.0 \times H_1 \leq H' \leq 3.0 \times H_1,$$

$$0.15 \times H \leq H_2 \leq 0.5 \times H,$$

$$H \leq 0.5 \times T$$

where:
T: sectional height of tire,
H: height of steel reinforcing layer 8 from bead heel 10,
$H_1$: height of rim flange 9 from bead heel 10,
$H_2$: vertical distance of steel reinforcing layer 8 interposed between upper filler 7 and bead filler 6,
H': height from bead heel 10 to a halving point of vertical distance $H_2$ of steel reinforcing layer.

If the height H' of the halving point of the vertical distance $H_2$ of the steel reinforcing layer 8 is less than 100% of the height $H_1$ of the rim flange 9, the steel reinforcing layer 8 will undergo compressive stress in the proximity of the rim flange, and if the former exceeds 300% of the latter, the steel reinforcing layer 8 will undergo compressive stress in the proximity of the upper filler 7, on the contrary.

It is further preferred that the height H' of the halving point of the vertical distance $H_2$ of the steel reinforcing layer 8 be set in the range of 150% to 250% of the height $H_1$ of the rim flange 9.

If the vertical distance $H_2$ of the steel reinforcing layer 8 interposed between the upper filler 7 and the bead filler 6 is less than 15% of the height H of the steel reinforcing layer 8, durability will drop at the intermediate point of the vertical distance $H_1$ of the steel reinforcing layer 8, and if the former exceeds 50% of the latter, the reinforcing effect by the steel reinforcing layer 8 will drop undesirably.

It is further preferred that the vertical distance $H_2$ of the steel reinforcing layer 8 interposed between the upper filler 7 and the bead filler 6 be set in the range of 20% to 40% of the height H of the steel reinforcing layer 8.

If the height H of the steel reinforcing layer 8 exceeds 50% of the sectional height T of the tire, the flex zone (blending zone) will become narrow and driving comfortableness will drop undesirably.

If the steel reinforcing layer 8 is disposed in such a manner as to satisfy each of the relations described above, it becomes possible to always keep the steel reinforcing layer 8 under the tensile stress state and the upper filler 7 and the bead filler 6 substantially under the compressive stress state when a load is applied to the tire during driving. Therefore, necessary rigidity can be secured most efficiently at the portions ranging from the bead portions, 1, 1 to the lower portions of the side walls 2, 2, and moreover, compressive rigidity that exerts adverse influences upon driving comfortableness does not drastically increase due to the addition of the steel reinforcing layer 8.

Figure 2:
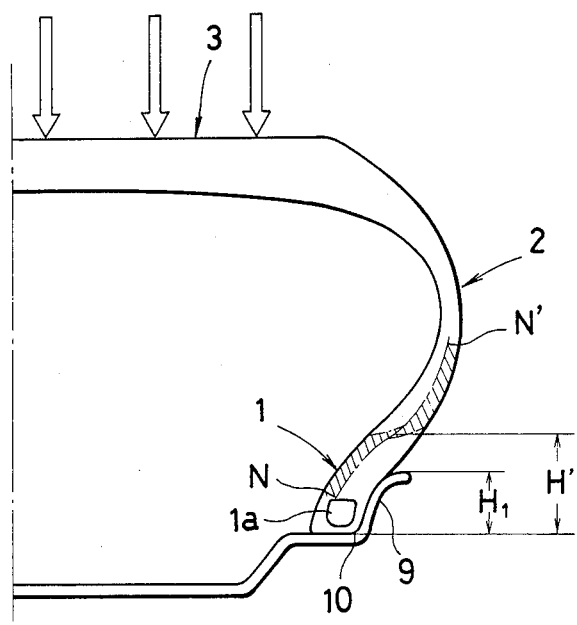
FIG. 2 is a partial cut-away schematic sectional view of the tire showing the state in which a load acts upon the tire during driving.

FIG. 2 shows the state under which a load acts upon the tire during driving.

In FIG. 2, portions with oblique lines are under the tensile stress condition, and N—N' is a neutral line between a tensile stress zone and a compressive tensile zone determined by an FEM calculation method (finite element method).

The steel reinforcing layer 8 of this tire is always positioned at the portions with the oblique lines in the tensile stress zone. Driving stability of the tire can be drastically improved by the steel reinforcing layer 8 that is under the tensile stress condition, but no substantial influences are exerted upon the increase of compressive rigidity that affects adversely driving comfortableness. The rubber layers of the upper filler 7 and bead filler 6 becomes a factor that determines the compressive rigidity. In other words, each side wall portion of the tire consists of the steel reinforcing layer 8 on which the tensile stress acts, and the upper filler 7 and bead filler 6 on which compressive stress acts, and the rigidity from the bead portion to the lower part of the side wall portion can be ideally improved without deteriorating driving comfortableness.

Figure 3:
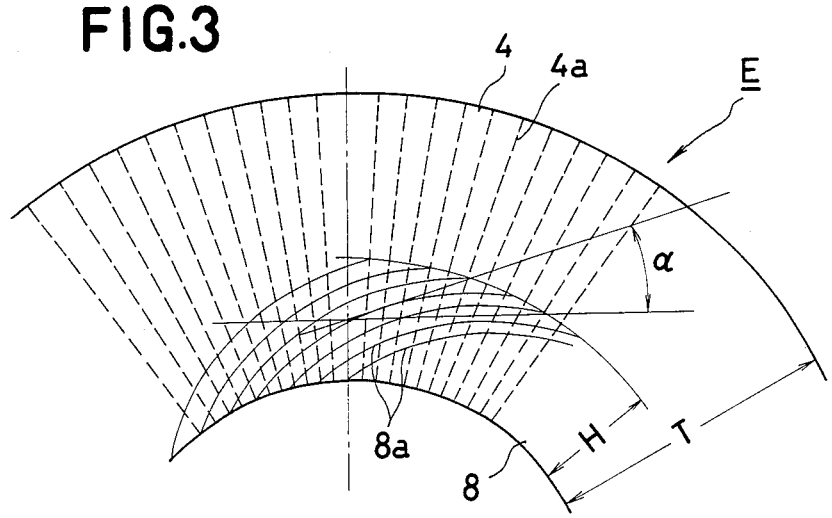
FIG. 3 is a schematic view showing the principal portions of the radial tire for a passenger car in accordance with the present invention.

FIG. 3 shows the angle α of the reinforcing cords 8a constituting the steel reinforcing layer 8 with respect to the tire circumferential direction. In order to improve the reinforcing effect, this angle α is preferably set in the range of 15° to 45°.

If the angle α is less than 15°, the bending rigidity of the steel reinforcing layer 8 will drop and if the angle α exceeds 45°, the bending rigidity becomes so high that rigidity balance will collapse undesirably.

More preferably, the angle α is within the range of 15° to 30°.

In the present invention, there is no need substantially to take the compressive rigidity of the steel reinforcing layer 8 into consideration, and the angle α of the reinforcing cords of the steel reinforcing layer 8 in the tire circumferential direction can be changeable in accordance with the intended performance of the tire.

Since the bead filler 6 and the upper filler 7 receive the compressive stress as described already, their hardness is preferably set within the range of JIS hardness 60° to 95°.

If the hardness of the bead filler 6 and upper filler 7 is less than JIS hardness 60°, the difference of their rigidity with the rigidity of the steel reinforcing layer becomes so great that durability will drop. If their hardness exceeds 95°, on the other hand, the hardness of the bead filler is so high that driving comfortableness will drop undesirably.

If the hardness of the bead filler 6 and upper filler 7 is set within the range of JIS hardness 80 to 90°, the difference of rigidity with the reinforcing cords 8a of the steel reinforcing layer 8 can be reduced and driving comfortableness can be improved advantageously.

The hardness of the bead filler 6 and that of the upper filler 7 may be different within the range of JIS hardness described above, and preferably the JIS hardness of the bead filler is equal to, or higher than, the JIS hardness of the upper filler.

If the relation of JIS hardness between the bead filler and the upper filler is opposite to the relation described above, the improving effect of the bead portions as a whole for driving comfortableness and driving stability will drop.

Figure 4:
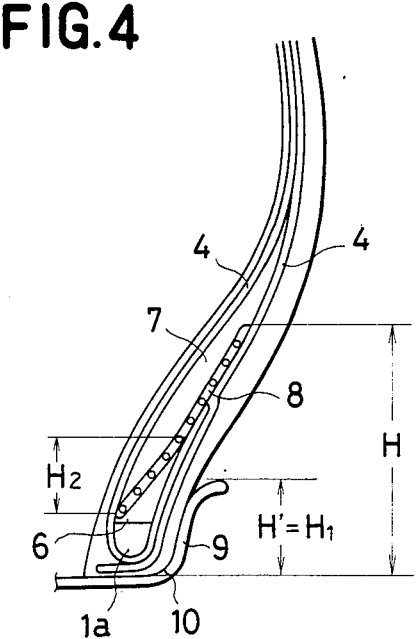
FIGS. 4 and 5 are schematic sectional views showing the principal portions of the radial tire for a passenger car in accordance with other embodiments of the present invention.
Figure 5:
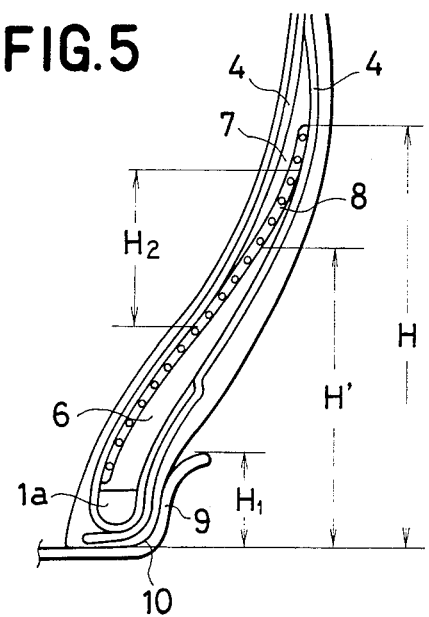
Figure 6:
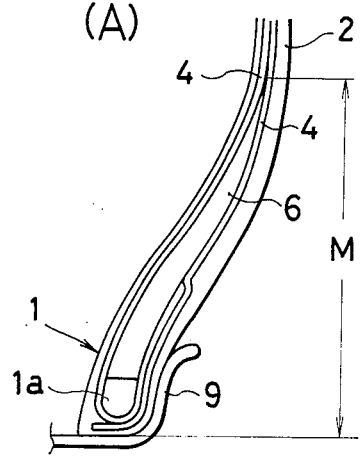
FIGS. 6(A) through 6(D) are schematic sectional views showing the principal portions of a tire as a comparative example and those of the tire of the present invention.
Figure 6:
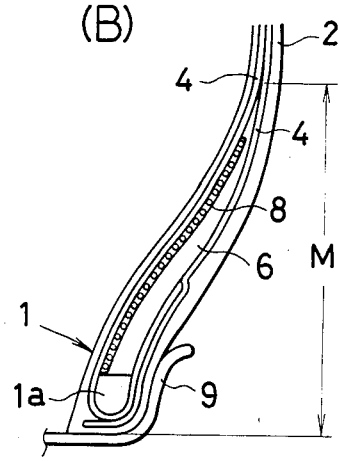
Figure 6:
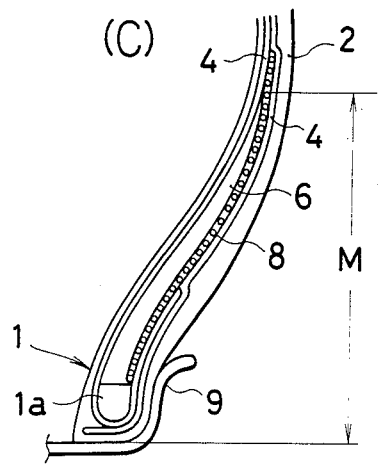
Figure 6:
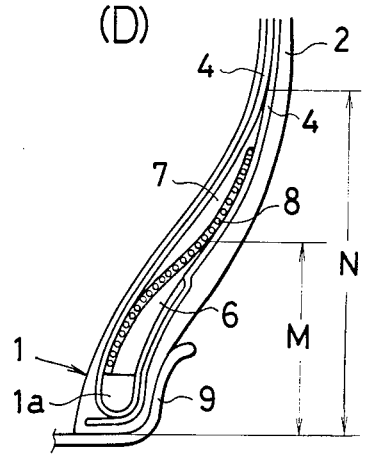

FIGS. 4 and 5 show the principal portions of the radial tires in accordance with other embodiments of the present invention. FIG. 4 is a schematic sectional view showing the principal portions of the present tire when $H'=1.0\times H_1$, $H_2=0.3\times H$ and $H=0.30\times T$. FIG. 5 is a schematic sectional view showing the principle portions of the present tire when $H'=3.0\times H_1$, $H_2=0.35\times H$ and $H=0.45\times T$ ($H,H^1,H_1,H_2$ and T are in mm).

Next, Experimental Examples will be illustrated in order to confirm the effect of the present invention.

EXPERIMENTAL EXAMPLE 1

Each of the sample tires having the following specification was produced and mounted to a test car, and maneuverability, stability and driving comfortableness were evaluated by five panelers (Tire specification)

| tire size | 195/70 R 14 |
|---|---|
| air pressure | 2.0 kg/cm$^2$ |
| weight of test car | 1,100 kg |
| tire structure | structures shown in FIGS. 6(A)-6(D). In the drawing, symbol M represents a bead filler height from bead heel and N does an upper filler height from bead heel |
| definite structures | as tabulated in Table 1 below. |

TABLE 1

| | (A) Tire of Comparative Example | (B) Tire of Comparative Example | (C) Tire of Comparative Example | (D) Tire of this Invention |
|---|---|---|---|---|
| H | | 60 | 80 | 60 |
| H' | | | | 35 |
| H$_2$ | | | | 15 |
| H/T | | 40% | 55% | 40% |
| angle of steel reinforcing layer | | 25° | 25° | 25° |
| bead filler hardness | 90° | 90° | 90° | 90° |
| upper filler hardness | | | | 90° |
| height of bead filler or upper filler | 70 | 70 | 70 | 70 |

(Test condition and Evaluation method)

Each of the sample tires was fitted to the test car. After the five panelers got on the test car, the car was driven at speeds of 30 to 100 km/hr on a JARI overall test road in order to evaluate maneuverability, stability and driving comfortableness.

Evaluation was made by the five panelers and their mean value was expressed by a ten-point method. Hence, the higher the point, the higher the performance.

The results of experiments are tabulated in Table 2.

TABLE 2

| | (A) Tire of Comparative Example | (B) Tire of Comparative Example | (C) Tire of Comparative Example | (D) Tire of this Invention |
|---|---|---|---|---|
| maneuverability | 7.0 | 7.0 | 7.2 | 8.0 |
| stability | 7.0 | 6.5 | 6.0 | 8.0 |
| driving comfortableness | 8.0 | 7.5 | 6.0 | 8.0 |

The following points (1) through (3) can be understood from Table 2.

(1) The tire (B) of Comparative Example did not exhibit any improvement in maneuverability over the tire (A) of the Comparative Example, but exhibited the drop in stability and driving comfortableness.

(2) The tire (C) of Comparative Example exhibited some improvements in maneuverability over the tire (A) of Comparative Example, but stability as well as driving confortableness dropped drastically.

(3) The tire (D) of the present invention could drastically improve maneuverability and stability over the tires (A), (B) and (C) of Comparative Examples, but driving comfortableness comparable to that of the tire (A) of Comparative Example could be secured.

EXPERIMENTAL EXAMPLE 2

Indoor high speed durability test and indoor load durability test were carried out using the same tires as those used in Experimental Example 1.
(Tire specification)
The same as those used in Experimental Example 1.
(Test condition)
As tabulated in Table 3.

TABLE 3

| indoor high speed durability test | internal pressure: | 3.0 kg/cm$^2$, drum diameter 1707 mm |
|---|---|---|
| | load: | 520 kg constant |
| | speed: | raised from 170 km/hr every 10 minutes at a rate of 10 km/hr till tire was broken. |
| indoor load durability test | internal pressure: | 2.4 kg/cm$^2$, drum diameter 1707 mm |
| | speed: | 81 km/hr constant |
| | load: | raised from 511 kg every 4 hours at a rate of 75 kg till tire was broken. |

The results of the tests are tabulated in Table 4.

Incidentally, evaluation was made in terms of index using the value of the tire (A) as 100.

TABLE 4

| | (A) Tire of Comparative Example | (B) Tire of Comparative Example | (C) Tire of Comparative Example | (D) Tire of this Invention |
|---|---|---|---|---|
| indoor high speed durability test | 100 | 103 | 120 | 146 |
| indoor load durability test | 100 | 105 | 68 | 138 |

As can be seen clearly from Table 4, the tire (D) of the present invention could drastically improve high speed durability as well as load durability in comparison not only with the tire (A) of Comparative Example but also with the tires (B) and (C) of Comparative Examples.

As described above, in accordance with the present invention, the upper filler is disposed on the tread portion side of the bead filler positioned on the bead wire buried in each bead portion, and a single steel reinforcing layer is disposed between the upper filler and the bead filler in such a manner that it extends from the outside of the upper filler to the inside of the bead filler and its height H from the bead heel does not exceed 50% of the sectional height T of the tire. Therefore, the steel reinforcing layer can be kept always under the tensile stress condition.

Therefore, maneuvering stability and durability (particularly high speed durability and load durability) can be drastically improved without reducing driving comfortableness.

We claim:

1. In a radial tire for a passenger car of the type which consists of a pair of right and left bead portions, a pair of right and left side wall portions continuing said bead portions, respectively, and a tread portion interposed between said side wall portions, and in which a carcass layer having a cord angle in the range of 70° to 90° to a tire circumferential direction is fitted between said bead portions, and a plurality of belt layers which have a cord angle in the range of 10° to 35° to the tire circumferential direction and in which the cords of one of said belt layers cross those of the other belt layers are disposed on said carcass layer at said tread portion;

the improvement wherein an upper filler is disposed on a tread portion side of a bead filler positioned on a bead wire buried in each of said bead portions, and a single steel reinforcing layer is interposed between said upper filler and said bead filler in such a fashion that said steel reinforcing layer extends from the outside of said upper filler to the inside of said bead filler, and its height H from a bead heel does not exceed 50% of a sectional height T of said tire.

2. A radial tire for a passenger car according to claim 1, wherein the angle $\alpha$ of reinforcing cords constituting said steel reinforcing layer is in the range of 15° to 45° to the tire circumferential direction.

3. A radial tire for a passenger car according to claim 1, wherein a vertical distance $H_2$ of said steel reinforcing layer interposed between said upper filler and said bead filler is set in the range of 20% to 40% of the height H of said steel reinforcing layer.

4. A radial tire for a passenger car according to claim 1, wherein the hardness of said bead filler and that of said upper filler are set in the range of JIS hardness 60° to 95°, respectively.

5. A radial tire for a passenger car according to claim 4, wherein the JIS hardness of said bead filler is equal to, or higher than, the JIS hardness of said upper filler.

* * * * *